Patented Apr. 14, 1953

2,635,058

UNITED STATES PATENT OFFICE 2,635,058

CURING COMPOSITION FOR PORCELAIN AND POTTERY

Homer Wooldridge, Jr., Metuchen, N. J.

No Drawing. Application May 4, 1951, Serial No. 224,655

4 Claims. (Cl. 106—313)

1

This invention relates to a curing composition and more particularly to such composition for use in the production of pottery and porcelain products.

In the production of porcelain the mix containing kaolin or china clay, ball clay, silica and feldspar is vitrified by subjecting it to a temperature of from 2250° to 2600° Fahrenheit for a period of several hours, for example, three hours. For the production of pottery or stoneware products, the mix containing fire clay, ball clay, silica, and grog or finely ground fired clay, is vitrified by subjecting it to a temperature of from 2200° to 2400° Fahrenheit for a period of time, for example, about one hour. These products exhibit loose bonding, show cracks and warping, and do not possess uniformity of hardness to the desired degree.

It has been found that by incorporating a curing composition in the mix for the production of porcelain and in the mix for the production of pottery or stoneware, the respective mixes can be vitrified by subjecting same to a lower temperature with the resultant products showing no warping, having an even surface, exhibiting dense bonding, and possessing uniformity of hardness to the desired degree.

Briefly stated, the curing composition of the present invention comprises a mixture of morpholine and a hydroxy alcohol in an aqueous medium.

The hydroxy alcohol may be an alcohol selected from the group consisting of methyl alcohol, ethyl alcohol, or glycerol.

The morpholine and alcohol are employed in the ratio of 7 to, and not substantially exceeding, 12 parts by weight of alcohol to about 1312.5 parts by weight of the morpholine.

Curing composition produced from the following ingredients in the listed proportions have been found to give satisfactory results:

| | Parts by weight |
|---|---|
| Water | 42,875 |
| Morpholine | 1,312.5 |
| Glycerol | 7.0 |
| | |
| Water | 42,875 |
| Morpholine | 1,312.5 |
| Ethyl alcohol | 12.0 |
| | |
| Water | 42,875 |
| Morpholine | 1,312.5 |
| Methyl alcohol | 12.0 |

2

Porcelain

For producing porcelain, a mix was first produced by admixing the following materials in the named proportions:

| | Parts by weight |
|---|---|
| Kaolin or china clay | 43 |
| Ball clay | 6 |
| Silica | 36 |
| Feldspar | 15 |

To 300 parts by weight of this mix was incorporated 1 part by weight of the curing composition in which glycerol was the alcohol employed. The formed slip was then placed in a kiln, and the temperature of the kiln was raised gradually within a 2 hour period to 700° Fahrenheit. After holding the temperature of the kiln at 700° Fahrenheit for about 40 minutes, the temperature was increased as rapidly as possible to 1975° Fahrenheit. The temperature of the kiln was then held at 1975° Fahrenheit for 3 hours, whereupon the heating was discontinued and the kiln was allowed to cool. A slip was also formed of this mix without the incorporation of the curing composition therein, and such slip was subjected to the same firing or vitrification treatment as the slip made from the mix to which the curing composition was incorporated therewith.

The curing composition-containing resultant product showed no signs of warpage, presented a smooth surface, exhibited dense bonding, and possessed uniformity of hardness with a shrinkage under 5%, while the non-curing composition containing resultant product fell apart upon being subjected to normal handling.

To 150 parts by weight of this mix was incorporated 1 part by weight of the curing composition containing ethyl alcohol, and to 150 parts by weight of this mix was incorporated 1 part by weight of the curing composition containing methyl alcohol, and a slip formed of each of such batches. A slip was also formed of this mix without the incorporation of the curing composition therein. These three slips were then subjected to the same firing or vitrification treatment above described.

The resultant curing composition containing two products likewise showed no signs of warpage, presented a smooth surface, exhibited dense bonding, and possessed uniformity of hardness to the desired degree, while the non-curing composition containing resultant product likewise fell apart upon being subjected to normal handling.

Stoneware

For producing stoneware, a mix was first produced by admixing the following materials in the named proportions:

| | Parts by weight |
|---|---|
| Fire clay | 52 |
| Ball clay | 10 |
| Silica | 18 |
| Grog, 80 mesh | 20 |

NOTE.—Grog is finely divided fired clay.

To 650 parts by weight of this mix is incorporated 1 part by weight of the curing composition in which glycerol was the alcohol employed. The formed slip was then placed in a kiln, and the temperature of the kiln raised at the rate of 180° Fahrenheit per hour until a temperature of 600° Fahrenheit was reached. After holding the kiln at a temperature of 600° Fahrenheit for 40 minutes, the temperature was increased as rapidly as possible to 1975° Fahrenheit. The temperature of the kiln was then held at 1975° for 1 hour, whereupon the temperature was reduced to 800° Fahrenheit and held at the latter temperature for 90 minutes. At the conclusion of the 90 minutes the heating of the kiln was discontinued and the kiln allowed to cool.

A slip was also formed of this mix without the incorporation of the curing composition therein, and such slip was subjected to the same firing or vitrification treatment as the slip made from the mix to which the curing composition was incorporated therewith.

The curing composition containing resultant product showed no signs of warpage, presented an even surface, exhibited dense bonding, and possessed uniformity of hardness with a shrinkage of about 10%, while the non-curing composition containing resultant product showed pronounced signs of cracking and warping.

To 150 parts by weight of this mix was incorporated 1 part by weight of the curing composition containing ethyl alcohol and to 150 parts by weight of this mix was incorporated 1 part by weight of the curing composition containing methyl alcohol and a slip was formed of each of such batches. A slip was also formed of this mix without the incorporation of the curing composition therein. These three slips were then subjected to the same firing or vitrification treatment above described.

The resultant curing composition containing two products likewise showed no signs of warpage, presented a smooth surface, exhibited dense bonding, and possessed uniformity of hardness to the desired degree with a shrinkage of about 10%, while the non-curing composition containing resultant product likewise showed pronounced signs of cracking and warping.

What is claimed is:

1. A curing composition consisting of a mixture of morpholine and an alcohol selected from the group consisting of methyl alcohol, ethyl alcohol, glycerol, in an aqueous medium, the morpholine and alcohol being employed in the ratio of 7 to and not substantially exceeding 12 parts by weight of alcohol to about 1312.5 parts by weight of morpholine.

2. A curing composition consisting of a mixture of approximately 1312.5 parts by weight of morpholine and approximately 7 parts by weight of glycerol in the presence of approximately 42,875 parts by weight of water.

3. A curing composition consisting of a mixture of approximately 1312.5 parts by weight of morpholine and approximately 12 parts by weight of ethyl alcohol in the presence of approximately 42,875 parts by weight of water.

4. A curing composition consisting of a mixture of approximately 1312.5 parts by weight of morpholine and approximately 12 parts by weight of methyl alcohol in the presence of approximately 42,875 parts by weight of water.

HOMER WOOLDRIDGE, Jr.

No references cited.